United States Patent
Jung et al.

(10) Patent No.: US 11,676,519 B2
(45) Date of Patent: Jun. 13, 2023

(54) DATA DRIVING CIRCUIT, METHOD FOR DETECTING NOISE OF DISPLAY SIGNAL, AND DISPLAY APPARATUS

(71) Applicant: LX Semicon Co., Ltd., Daejeon (KR)

(72) Inventors: Hee Yoon Jung, Daejeon (KR); Hyung Sub Kim, Daejeon (KR); Jung Hyun Tark, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/857,501

(22) Filed: Jul. 5, 2022

(65) Prior Publication Data
US 2023/0005401 A1    Jan. 5, 2023

(30) Foreign Application Priority Data
Jul. 5, 2021   (KR) ................ 10-2021-0087849

(51) Int. Cl.
G09G 3/00    (2006.01)
G06F 3/041   (2006.01)
G09G 3/3275  (2016.01)
G09G 3/36    (2006.01)

(52) U.S. Cl.
CPC ......... G09G 3/006 (2013.01); G06F 3/04182 (2019.05); G09G 3/3275 (2013.01); G09G 3/3685 (2013.01); G09G 2330/12 (2013.01); G09G 2354/00 (2013.01); G09G 2370/14 (2013.01)

(58) Field of Classification Search
CPC .............. G06F 3/04182; G09G 3/3275; G09G 3/3685; G09G 3/006; G09G 2370/14; G09G 2330/12; G09G 2354/00
USPC ...................................... 345/98, 14
See application file for complete search history.

(56) References Cited

U.S. PATENT DOCUMENTS

| | | | | |
|---|---|---|---|---|
| 2008/0094339 A1* | 4/2008 | Lin | ....... | G09G 3/3611 345/98 |
| 2008/0238819 A1* | 10/2008 | Ryu | ....... | G09G 3/006 345/55 |
| 2010/0207930 A1* | 8/2010 | Chung | ....... | G09G 3/3611 345/214 |
| 2011/0102395 A1* | 5/2011 | Cheng | ....... | G09G 3/3614 345/94 |
| 2012/0299974 A1* | 11/2012 | Park | ....... | G09G 3/3688 345/690 |
| 2021/0390924 A1 | 12/2021 | Kim et al. | | |
| 2022/0028320 A1 | 1/2022 | Kim et al. | | |

* cited by examiner

Primary Examiner — Jimmy H Nguyen
(74) Attorney, Agent, or Firm — Polsinelli PC

(57) ABSTRACT

The present embodiment provides a technology for sensing a common mode voltage in the positive line and negative line of a transmission line for image data and determining whether noise occurs in the image data transmitted through the transmission line by comparing the common mode voltage with a set reference voltage.

20 Claims, 7 Drawing Sheets

DATA DRIVING CIRCUIT, METHOD FOR DETECTING NOISE OF DISPLAY SIGNAL, AND DISPLAY APPARATUS

CROSS REFERENCE TO RELATED APPLICATION

This application claims priority from Republic of Korea Patent Application No. 10-2021-0087849 filed on Jul. 5, 2021, which is hereby incorporated by reference in its entirety.

BACKGROUND

1. Field of Technology

The present embodiment relates to a data driving circuit, a noise detection method and a display apparatus.

2. Description of the Prior Art

As informatization is in progress, various display apparatuses capable of visualizing information is being developed. A liquid display device (LCD), an organic light-emitting diode (OLED) display device, a plasma display panel (PDP) display device, etc. are display apparatuses which have been developed up to recently or are being developed. Such display apparatuses are advanced to properly display a high resolution image.

There may be lots of methods of driving a display panel in which an LED is disposed. A representative method includes a pulse amplitude modulation (PAM) method and a pulse width modulation (PWM) method. The PAM method is a method of supplying a panel with an analog voltage corresponding to a grayscale value of a pixel and differently controlling the size of current flowing into the pixel based on the analog voltage. The PWM method is a method of adjusting the time of a current supplied to a pixel based on a grayscale value of the pixel.

For example, a display panel includes multiple pixels (or sub-pixels). A desired image may be displayed as a light-emitting diode (LED) included in each pixel emits light in response to a current flowing into the LED.

A display apparatus may convert, into data (e.g., RGB data) having a proper format, image data inputted to a controller (e.g., a timing controller T-CON) and transmit the data to a data driving circuit (e.g., a source driver IC (SD-IC)) in order to display a desired image through the display panel. The data driving circuit may supply each pixel (or sub-pixel) with a data voltage for driving the pixel (or sub-pixel) included in the display panel based on the image data received from the controller.

The controller may be connected to the data driving circuit through a differential signal transmission line (for example, a low-voltage differential signal (LVDS) transmission line) for the effective and fast transmission of the image data. The image data transmitted through the LVDS transmission line may experience interference attributable to noise (e.g., phone noise) occurring nearby.

For example, if a smartphone, etc. are placed near the LVDS transmission line for transmitting the image data and a call is made or data is transmitted and received through the smartphone, high frequency signals (e.g., a signal having several GHz to several tens of GHz bands) transmitted to and received from the smartphone may cause interference on the LVDS transmission line, so a failure may occur in the image data. As described above, the display apparatus may have a problem with picture quality by outputting an image based on image data including the failure.

SUMMARY OF THE INVENTION

Under such a background, in one aspect, various embodiments are directed to providing a data driving circuit, a method for detecting noise of a display signal and a display apparatus, which can detect noise occurring in a low-voltage differential signal (LVDS) connected from a controller (e.g., a timing controller) to a data driving circuit (e.g., an SD-IC).

In an aspect, the present embodiment provides a data driving circuit including: a reception circuit to receive image data transmitted from a controller through a low-voltage differential signal (LVDS) transmission line; and a noise detection circuit to sense a common mode voltage of an LVDS in a positive line and a negative line of the LVDS transmission line and to determine whether noise occurs in the image data transmitted through the LVDS transmission line by comparing the common mode voltage with a reference voltage.

In another aspect, the present embodiment provides a method for detecting noise of a display signal, including: receiving image data from a controller through a low-voltage differential signal (LVDS) transmission line; sensing a common mode voltage of an LVDS in a positive line and a negative line of the LVDS transmission line; and determining whether noise occurs in the image data transmitted through the LVDS transmission line by comparing the common mode voltage with a reference voltage.

In still another aspect, the present embodiment provides a display apparatus including: a data driving circuit to supply through a data line a data voltage for driving each pixel in a panel in which a plurality of pixels are disposed; and a controller to transmit image data to the data driving circuit through a low-voltage differential signal (LVDS) transmission line, wherein the data driving circuit includes a noise detection circuit to sense a common mode voltage of an LVDS in a positive line and a negative line of the LVDS transmission line connected with the controller and to determine whether noise occurs in the image data transmitted through the LVDS transmission line by comparing the common mode voltage with a set reference voltage.

As described above, according to the present embodiment, quality of display data can be improved by detecting noise occurring in an LVDS connected from the controller (e.g., a timing controller) to the data driving circuit (e.g., an SD-IC).

Furthermore, according to the present embodiment, a picture quality problem can be more effectively improved by previously detecting noise in an initial section in which noise occurs in a communication line compared to a conventional detection method using a lock signal generation circuit.

DETAILED DESCRIPTION OF THE EXEMPLARY EMBODIMENTS

Figure 1:
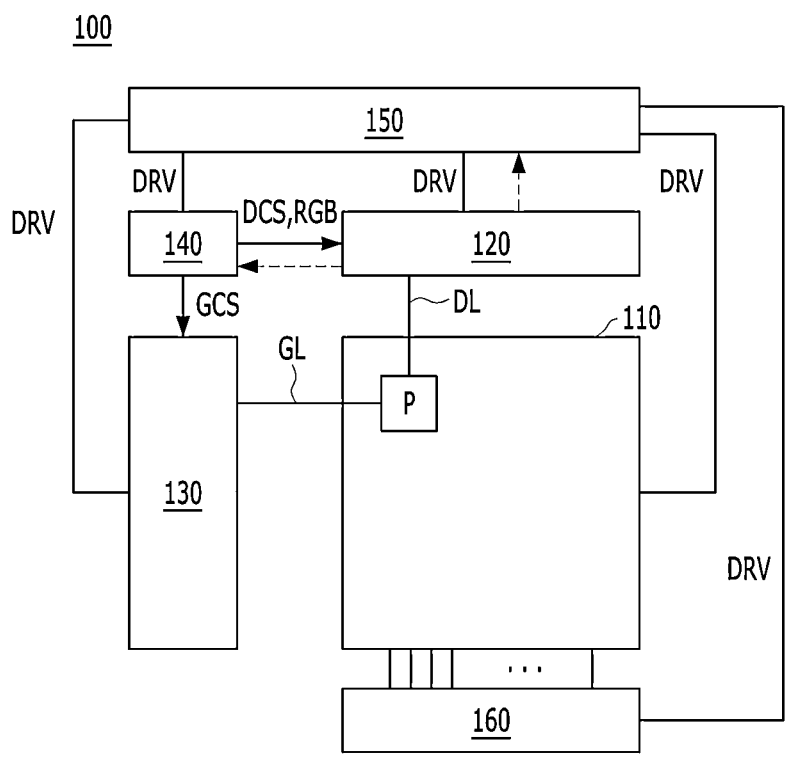
FIG. 1 is a configuration diagram of a display apparatus according to an embodiment.

FIG. 1 is a configuration diagram of a display apparatus according to an embodiment.

Referring to FIG. 1, a display apparatus 100 may include a panel 110, a data driving circuit 120, a gate driving circuit 130, a data processing circuit 140, a power management IC (PMIC) 150, and a touch sensing circuit 160.

A plurality of data lines DL and a plurality of gate lines GL may be disposed in the panel 110. A plurality of pixels P (or sub-pixels) may be disposed in the panel 110. The panel 110 (or a display panel) may be a light-emitting display panel. In this case, the pixels P disposed in the panel 110 may include an LED and one or more transistors. The panel 110 (or a display panel) may be an organic light-emitting display panel. In this case, the pixels P disposed in the panel 110 may include an organic light-emitting diode (OLED) and one or more transistors, but the present disclosure is not limited thereto. According to another embodiment, the panel 110 may be an LCD panel.

A plurality of touch electrodes TE may be disposed in the panel 110. The touch sensing circuit 160 may drive the touch electrodes TE by using a driving signal. Furthermore, the touch sensing circuit 160 may generate a sensing value for the touch electrode TE in response to a response signal formed in the touch electrode TE in response to the driving signal. Furthermore, the touch sensing circuit 160 may calculate touch coordinates by using sensing values for a plurality of touch electrodes TE disposed in the panel 110. The calculated touch coordinates may be transmitted to and used by another apparatus (e.g., a host or a controller (e.g., a touch micro control unit (MCU) (TMCU) or a timing controller) or a processor).

The panel 110 may display an image having a given grayscale or may receive a touch by a hand (or a finger) or an active pen (or an electronic pen). The panel 110 may be a display panel having an in-cell touch type structure using a capacitance method. In an embodiment, the panel 110 may be an in-cell touch type display panel using a self-capacitance method or an in-cell touch type display panel using a mutual capacitance method.

The panel 110 may operate in a display mode and a touch sensing mode. If the panel 110 is an LCD panel, the panel may play a role as a touch panel for displaying an image by using light radiated from a backlight circuit in the display mode and performing touch sensing in the touch sensing mode.

The gate driving circuit 130 may supply a gate line GL with a scan signal having a turn-on voltage or a turn-off voltage. When the scan signal having the turn-on voltage is supplied to a pixel P, the pixel P may be connected to a data line DL. When the scan signal having the turn-off voltage is supplied to a pixel P, the pixel P may be disconnected from the data line DL.

The data driving circuit 120 may supply a data voltage to a data line DL. The data voltage supplied to the data line DL may be transferred to a pixel P connected to the data line DL in response to a scan signal.

The data processing circuit 140 may supply various types of control signals to the gate driving circuit 130 and the data driving circuit 120. The data processing circuit 140 may generate a gate control signal GCS which controls scan to be started at timing implemented in each frame, and may transmit the gate control signal GCS to the gate driving circuit 140.

Furthermore, the data processing circuit 140 may convert image data (hereinafter referred to as "first image data"), received from the outside, into image data (e.g., RGB data) (hereinafter referred to as "second image data") suitable for a data signal format used in the data driving circuit 120, and may output the second image data (e.g., RGB data) to the data driving circuit 120. Furthermore, the data processing circuit 140 may transmit a data control signal DCS that controls the data driving circuit 120 to supply a data voltage to each pixel P at each timing.

The data driving circuit 120 may be named a source driver SD. Furthermore, the gate driving circuit 130 may be named a gate driver GD. Furthermore, the data processing circuit 140 may be named a controller or a timing controller T-CON. The data driving circuit 120 may be included in one integrated circuit and named a source driver integrated circuit (IC) SD-IC. Furthermore, the data driving circuit 120 and the data processing circuit 140 may be included in one integrated circuit and named an integrated IC. The present embodiment is not limited by such names. In the following descriptions of the embodiments, the descriptions of some elements commonly known in a source driver, a gate driver, a timing controller, etc. are omitted. Accordingly, in understanding of an embodiment, it needs to be considered that such some elements may be omitted.

The PMIC 150 may supply power to the panel 110, the data driving circuit 120, the gate driving circuit 130, the data processing circuit 140, or the touch sensing circuit 160. The PMIC 150 may supply power by transmitting a driving voltage DRV to the panel 110, the data driving circuit 120, the gate driving circuit 130, the data processing circuit 140, or the touch sensing circuit 160 through a power line. The driving voltages DRV having the same voltage value or different voltage values may be applied to the respective circuits. The PMIC 150 may play a role as a power supply source for the panel 110, the data driving circuit 120, the gate driving circuit 130, the data processing circuit 140, and the touch sensing circuit 160.

According to an embodiment, the data processing circuit 140 may convert image data (first image data), received from the outside, into image data (second image data) (e.g., RGB data) suitable for a data signal format used in the data driving circuit 120, and may output the second image data (e.g., RGB data) to the data driving circuit 120 through a differential signal transmission line (for example, a low-voltage differential signal (LVDS) transmission line). The second image data transmitted through the LVDS transmission line may experience interference attributable to noise (e.g., phone noise) occurring nearby. For example, if a smartphone, etc. are placed near the LVDS transmission line for transmitting the second image data and a call is made or data is transmitted and received through the smartphone, high frequency signals (e.g., a signal having several GHz to several tens of GHz bands) transmitted to and received from the smartphone may cause interference on the LVDS transmission line, so a failure may occur in image data. The data driving circuit 120 of the display apparatus 100 may cause a picture quality problem on an image displayed on the panel 110 by supplying a data voltage to each pixel P based on the image data having the failure.

Hereinafter, in the following embodiments, a display apparatus and method capable of preventing the occurrence of a picture quality problem and improving picture quality by detecting noise occurring in the LVDS transmission line are described.

Figure 2:
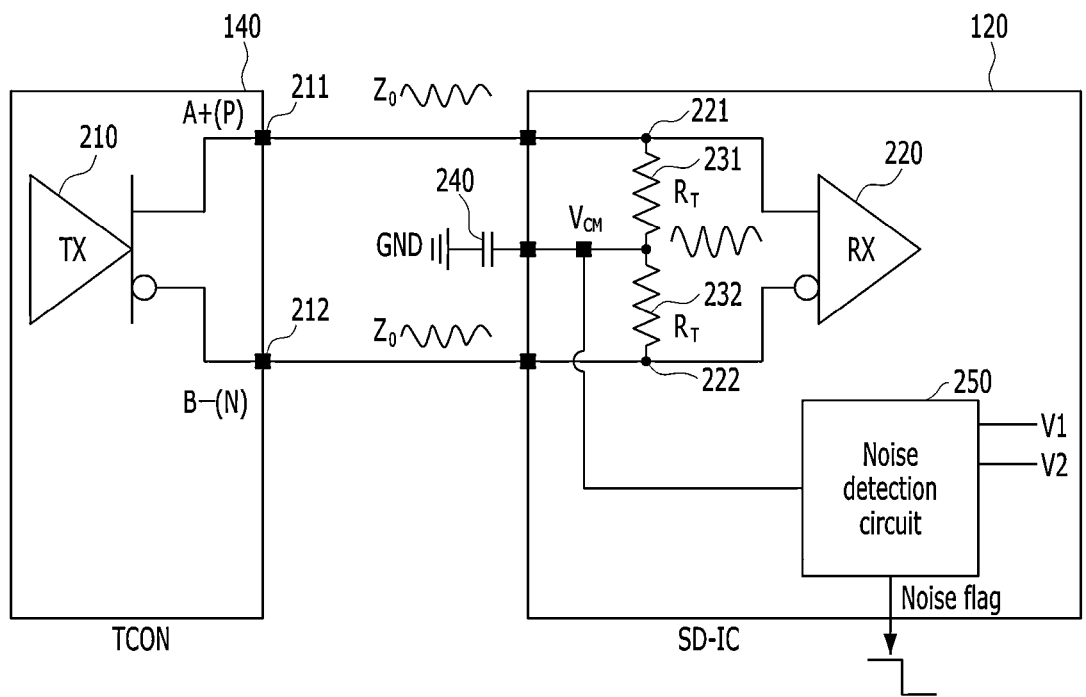
FIG. 2 is a detailed configuration diagram of the display apparatus according to an embodiment.

FIG. 2 is a detailed configuration diagram of the display apparatus according to an embodiment. Referring to FIG. 2, the display apparatus 100 may include the controller 140 (e.g., a timing controller T-CON) and the data driving circuit 120 (e.g., a source driver IC SD-IC). As described above, the controller 140 may convert image data (first image data), received from the outside, into image data (second image data) (e.g., RGB data) suitable for a data signal format used in the data driving circuit 120, and may transmit the second image data (e.g., RGB data) to the data driving circuit 120 through an LVDS transmission line.

More specifically, a transmission circuit 210 of the controller 140 may transmit image data through a positive terminal 211 (A+(P)) and negative terminal 212 (B−(N)) of the LVDS transmission line. The image data transmitted through the LVDS transmission line may be transmitted as a signal having a voltage of a form illustrated in FIG. 4. For example, methods identical with or similar to publicly-known methods may be applied to a transmission method through the LVDS transmission line. Since the publicly-known methods may be used as the LVDS transmission method, a detailed description of the LVDS transmission method is omitted.

Figure 4:
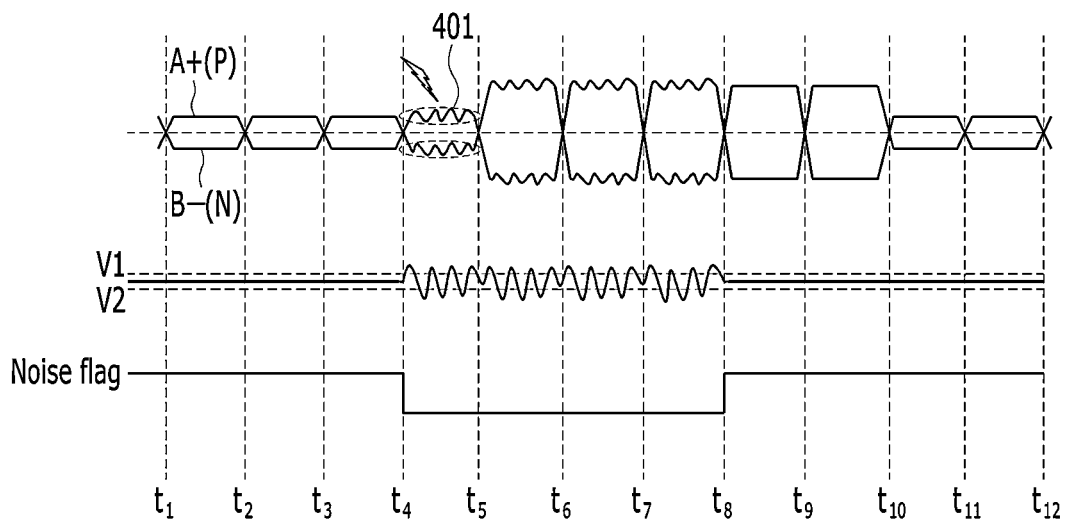
FIG. 4 is a diagram illustrating noise occurring in an LVDS transmission line according to an embodiment.

A reception circuit 220 of the data driving circuit 120 may receive image data through a positive terminal 221 (A+(P)) and negative terminal 222 (B−(N)) of the LVDS transmission line. According to an embodiment, noise 401 may occur for various reasons on the LVDS transmission line connected between the controller 140 and the data driving circuit 120, as illustrated in FIG. 4. For example, if a smartphone, etc. are placed near the LVDS transmission line and a call is made or data is transmitted and received through the smartphone, high frequency signals (e.g., a signal having several GHz to several tens of GHz bands) transmitted to and received from the smartphone may cause noise on the LVDS transmission line.

According to an embodiment, the data driving circuit 120 may include a noise detection circuit 250. Noise occurring on the LVDS transmission line may be detected by the noise detection circuit 250. For example, phone noise attributable to the smartphone may periodically occur on the LVDS transmission line in the same phase as an LVDS, and may cause the same noise $Z_0$ in a common mode voltage $V_{CM}$ of the LVDS transmission line.

More specifically, the data driving circuit 120 may include two resistors (e.g., termination resistors $R_T$) 231 and 232 between the positive terminal 221 (A+(P)) and negative terminal 222 (B−(N)) of the LVDS transmission line connected to the reception circuit 220. The two resistors may be connected in series, and are denoted as a first resistor ($R_T$) 231 and a second resistor ($R_T$) 232 for convenience of description. A resistance value of the first resistor 231 and a resistance value of the second resistor 232 may be the same as or different from each other. A voltage between the first resistor 231 and the second resistor 232 may be denoted as the common mode voltage $V_{CM}$ of the LVDS. For example, assuming that a resistance value of the first resistor 231 and a resistance value of the second resistor 232 are the same as each other, the common mode voltage $V_{CM}$ may be an intermediate value between a voltage of the positive terminal 221 (A+(P)) and a voltage of the negative terminal 222 (B−(N)). According to an embodiment, one end of a capacitor 240 (e.g., a termination capacitor $C_{TERM}$) may be connected between the first resistor 231 and the second resistor 232, and the other end of the capacitor 240 may be connected to a ground GND.

According to an embodiment, the noise detection circuit 250 may be connected between the first resistor 231 and the second resistor 232 that are connected in series, and may sense the common mode voltage $V_{CM}$ of the LVDS. For example, the noise detection circuit 250 may detect noise occurring on the LVDS transmission line by comparing the common mode voltage with at least one reference voltage Vref. According to an embodiment, when the sensed common mode voltage is higher than a first set reference voltage V1, the noise detection circuit 250 may determine that noise has occurred. Furthermore, when the sensed common mode voltage is lower than a second set reference voltage V2, the noise detection circuit 250 may determine that noise has occurred. The second reference voltage V2 may be set as a value smaller than the first reference voltage V1. For example, when the sensed common mode voltage is between the first reference voltage V1 and the second reference voltage V2, the noise detection circuit 250 may determine that the sensed common mode voltage is a normal signal in which noise has not occurred on the LVDS transmission line. The first reference voltage V1 or the second reference voltage V2 may be adjusted by a set value set in the data driving circuit 120 or a set value received from the outside of the data driving circuit 120. For example, the sensitivity of noise detection may be adjusted by adjusting the first reference voltage V1 or the second reference voltage V2.

According to an embodiment, the noise detection circuit 250 may generate a noise flag on the basis of a result of a comparison between the common mode voltage and the first reference voltage or the second reference voltage. For example, when the sensed common mode voltage is higher than the first reference voltage or is lower than the second reference voltage, the noise detection circuit 250 may generate a noise flag. According to an embodiment, after generating the noise flag, the noise detection circuit 250 may maintain the generation of the noise flag for a set time. The noise detection circuit 250 may adjust the sensitivity of noise detection by changing a duration L of the noise flag. The noise flag may indicate information on whether noise occurs. For example, according to an embodiment, the noise flag set as "0" may mean that noise has occurred. According to another embodiment, the noise flag set as "1" may mean that noise has occurred.

According to an embodiment, the noise flag outputted by the noise detection circuit 250 may indicate information on whether noise occurs. The noise flag may be transmitted to at least one of the controller 140 (e.g., a timing controller T-CON)), the PMIC 150, a touch controller (e.g., a touch MCU (TMCU)), a source driver and touch readout IC (SRIC), and a touch readout IC (ROIC)).

According to an embodiment, the data driving circuit 120 that has received the noise flag from the noise detection circuit 250 may control an image to be not updated. According to an embodiment, the controller 140 (e.g., a timing controller T-CON) that has received the noise flag from the noise detection circuit 250 may control image data (e.g., second image data) to be retransmitted to the data driving circuit 120 through the LVDS transmission line. For example, the controller 140 that has received the noise flag from the noise detection circuit 250 may control a voltage of the LVDS transmission line to be increased and an increased voltage thereof to be transmitted according to an automatic voltage identification (VID) function.

Figure 3:
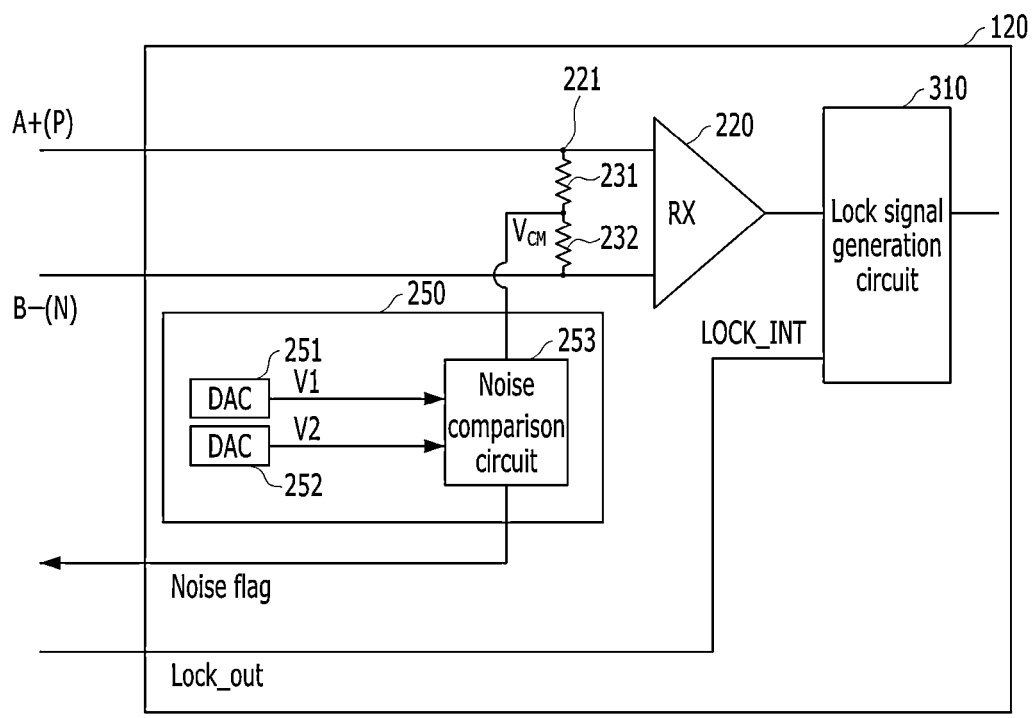
FIG. 3 is a detailed configuration diagram of a data driving circuit according to an embodiment.

FIG. 3 is a detailed configuration diagram of a data driving circuit according to an embodiment. Referring to FIG. 3, according to an embodiment, the data driving circuit 120 may include the reception circuit 220, the noise detection circuit 250, and a lock signal generation circuit 310.

As described above with reference to FIG. 2, the reception circuit 220 of the data driving circuit 120 may receive image data through the positive terminal 221 (A+(P)) and negative terminal 222 (B−(N)) of the LVDS transmission line. According to an embodiment, the noise 401 may occur for various reasons on the LVDS transmission line connected between the controller 140 and the data driving circuit 120, as illustrated in FIG. 4. For example, if a smartphone, etc. are placed near the LVDS transmission line and a call is made or data is transmitted and received through the smartphone, high frequency signals (e.g., a signal having several GHz to several tens of GHz bands) transmitted to and received from the smartphone may cause noise on the LVDS transmission line.

According to an embodiment, the data driving circuit 120 may include the lock signal generation circuit 310 connected to the reception circuit 220. When it is determined that noise or any abnormality has occurred in the image data (second image data) received from the controller 140, the lock signal generation circuit 310 may generate a lock signal Lock out through a clock training circuit. The lock signal may occur when noise becomes severe on the LVDS transmission line, and thus the lock signal generation circuit 310 may not detect noise in an initial section in which noise occurs on the LVDS transmission line. In an embodiment of the present disclosure, noise may be detected by the noise detection circuit 250 although the lock signal generation circuit 310 does not detect the noise in the initial section in which the noise occurs on the LVDS transmission line.

According to an embodiment, the data driving circuit 120 may include the noise detection circuit 250, and the noise detection circuit 250 may detect noise occurring on the LVDS transmission line. For example, phone noise attributable to the smartphone may periodically occur in the same phase as that of the LVDS on the LVDS transmission line, and may cause the same noise in the common mode voltage $V_{CM}$ of the LVDS transmission line.

More specifically, the data driving circuit 120 may include the two resistors (e.g., termination resistors $R_T$) 231 and 232 between the positive terminal 221 (A+(P)) and negative terminal 222 (B−(N)) of the LVDS transmission line connected to the reception circuit 220. According to an embodiment, the noise detection circuit 250 may be connected between the first resistor 231 and the second resistor 232 that are connected in series, and may sense the common mode voltage ($V_{CM}$) of the LVDS. For example, the noise detection circuit 250 may detect noise occurring on the LVDS transmission line by comparing the common mode voltage with at least one reference voltage Vref.

According to an embodiment, the noise detection circuit 250 may include a first digital to analog converter (DAC) 251, a second DAC 252, and a noise comparison circuit 253. The first DAC 251 may receive a digital set value corresponding to the first reference voltage V1, and may output a corresponding analog voltage signal V1. The second DAC 252 may receive a digital set value corresponding to the second reference voltage V2, and may output a corresponding analog voltage signal V2. The digital set value inputted to the first DAC 251 or the second DAC 252 may be set in the data driving circuit 120 or may be received from the outside of the data driving circuit 120. For example, the sensitivity of noise detection may be adjusted by adjusting the first reference voltage V1 or the second reference voltage V2.

According to an embodiment, the noise comparison circuit 253 may compare the sensed common mode voltage $V_{CM}$ with the first reference voltage V1 outputted by the first DAC 251 and/or the second reference voltage V2 outputted by the second DAC 252, and may output a noise flag corresponding to a result of the comparison. For example, when the sensed common mode voltage is higher than the first reference voltage V1, the noise comparison circuit 253 may determine that noise has occurred and output the noise flag as "0." Furthermore, when the sensed common mode voltage is lower than the second reference voltage V2, the noise comparison circuit 253 may determine that noise has occurred and output the noise flag as "0." The second reference voltage V2 may be set as a value smaller than the first reference voltage V1. For example, when the sensed common mode voltage is between the first reference voltage V1 and the second reference voltage V2, the noise comparison circuit 253 may determine that the sensed common mode voltage is a normal signal in which noise does not occur on the LVDS transmission line, and may output the noise flag as "1." According to an embodiment, the noise flag may be set to "0" indicating the state in which noise has occurred, and may be set to "1" indicating the state in which noise has not occurred. According to another embodiment, the noise flag may be set to "1" indicating the state in which noise has occurred, and may be set to "0" indicating the state in which noise has not occurred. In the following embodiments, it is assumed that the noise flag is set to "0" indicating the state in which noise has occurred.

According to an embodiment, after generating the noise flag, the noise detection circuit 250 may maintain the generation of the noise flag for a set time. The noise detection circuit 250 may adjust the sensitivity of noise detection by changing the duration L of the noise flag.

According to an embodiment, the noise flag outputted by the noise detection circuit 250 may indicate information on whether the noise occurs. The noise flag may be transmitted to at least one of the controller 140 (e.g., a timing controller T-CON)), the PMIC 150, a touch controller (e.g., a touch MCU (TMCU)), a source driver and touch readout IC (SRIC), and a touch readout IC (ROIC)).

According to an embodiment, the data driving circuit 120 that has received the noise flag from the noise detection circuit 250 may control an image to be not updated. According to an embodiment, the controller 140 (e.g., a timing controller T-CON) that has received the noise flag from the noise detection circuit 250 may control image data (e.g., second image data) to be retransmitted to the data driving circuit 120 through the LVDS transmission line. For example, the controller 140 that has received the noise flag from the noise detection circuit 250 may control a voltage of the LVDS transmission line to be increased and an increased voltage thereof to be transmitted according to the automatic VID function.

FIG. 4 is a diagram illustrating noise occurring in an LVDS transmission line according to an embodiment. Referring to FIG. 4, as described above with reference to FIGS. 2 and 3, the reception circuit 220 of the data driving circuit 120 may receive image data through the positive terminal 221 (A+(P)) and negative terminal 222 (B−(N)) of the LVDS transmission line. For various reasons, the noise 401 may occur on the LVDS transmission line, as illustrated in FIG. 4. For example, if a smartphone, etc. are placed near the LVDS transmission line and a call is made or data is transmitted and received through the smartphone, high frequency signals (e.g., a signal having several GHz to several tens of GHz bands) transmitted to and received from the smartphone may cause noise on the LVDS transmission line. When a noise signal equal to or greater than a reference voltage is introduced through the positive terminal 221 (A+(P)) and negative terminal 222 (B−(N)) of the LVDS transmission line, the common mode voltage may move in the same phase and amplitude as the noise signal.

According to an embodiment, the data driving circuit 120 may include the noise detection circuit 250, and the noise detection circuit 250 may detect noise occurring on the LVDS transmission line by sensing the common mode voltage $V_{CM}$.

For example, as illustrated in FIG. 4, a noise signal has not occurred during a time $t_1$ to a time t4, but a noise signal may occur during the time t4 to a time $t_8$. The common mode voltage $V_{CM}$ is maintained between the first reference voltage V1 and the second reference voltage V2 because the common mode voltage $V_{CM}$ has a constant voltage value according to an LVDS during the time $t_1$ to the time t4 in which a noise signal does not occur. However, the common mode voltage $V_{CM}$ may deviate from a voltage between the first reference voltage V1 and the second reference voltage V2 because the common mode voltage $V_{CM}$ moves in the same phase and amplitude as a noise signal during the time t4 to the time is in which the noise signal occurs.

According to an embodiment, the noise detection circuit 250 may determine whether a noise signal occurs, by comparing the common mode voltage with the first reference voltage V1 and the second reference voltage V2. As the common mode voltage $V_{CM}$ is maintained between the first reference voltage V1 and the second reference voltage V2 during the time $t_1$ to the time t4 in which a noise signal does not occur, the noise detection circuit 250 may maintain the noise flag to "1" to notify that noise has not occurred in the corresponding section. In contrast, as the common mode voltage $V_{CM}$ deviates from a voltage between the first reference voltage V1 and the second reference voltage V2 during the time t4 to the time is in which a noise signal occurs, the noise detection circuit 250 may change the noise flag from "1" to "0" and output the changed noise flag to notify that noise has occurred in the corresponding section.

Figure 5:
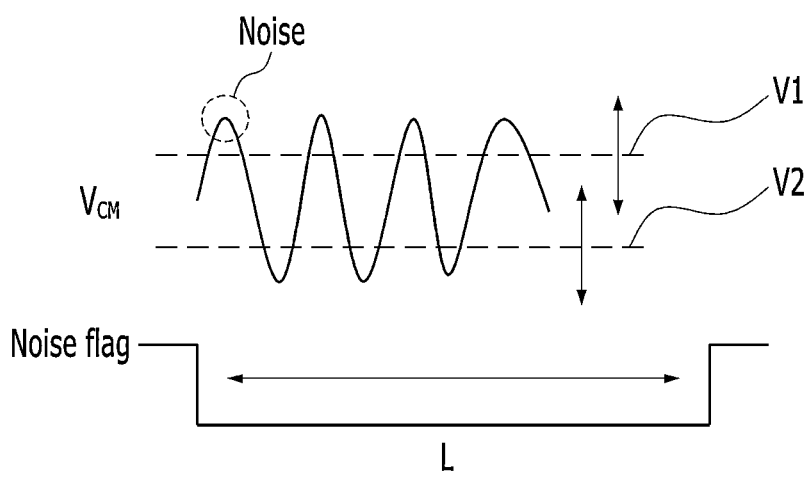
FIG. 5 is a diagram illustrating an operation of a noise detection circuit according to an embodiment.

FIG. 5 is a diagram illustrating an operation of the noise detection circuit according to an embodiment. Referring to FIG. 5, according to an embodiment, the noise comparison circuit 253 may compare the sensed common mode voltage $V_{CM}$ with the first reference voltage V1 outputted by the first DAC 251 or the second reference voltage V2 outputted by the second DAC 252, and may output a noise flag corresponding to a result of the comparison. For example, when the sensed common mode voltage is higher than the first reference voltage V1 or lower than the second reference voltage V2, the noise comparison circuit 253 may determine that noise has occurred and output the noise flag as "0." The second reference voltage V2 may be set as a value smaller than the first reference voltage V1. According to an embodiment, the noise flag may be set to "0" indicating the state in which noise has occurred, and may be set to "1" indicating the state in which noise has not occurred. According to another embodiment, the noise flag may be set to "1" indicating the state in which noise has occurred, and may be set to "0" indicating the state in which noise has not occurred.

According to an embodiment, after generating the noise flag, the noise detection circuit 250 may maintain the generation of the noise flag for a set time. The noise detection circuit 250 may adjust the sensitivity of noise detection by changing the duration L of the noise flag. The noise flag may indicate information on whether noise occurs. For example, the noise flag may be set as "0" may mean that noise has occurred. Otherwise, the noise flag may be set as "1" may mean that noise has occurred.

Figure 6:
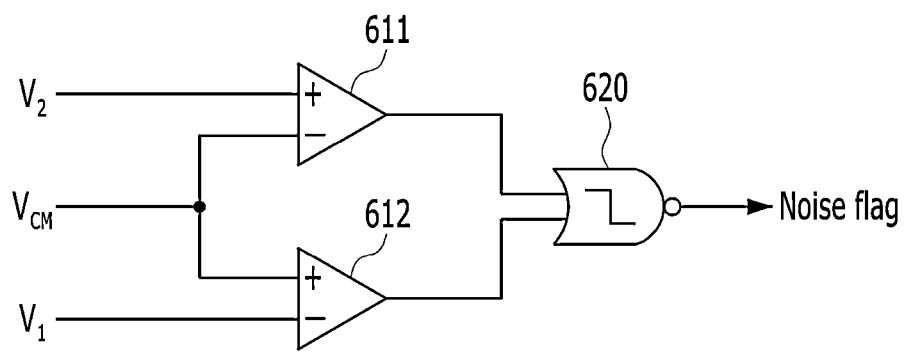
FIG. 6 is a diagram illustrating a noise comparison circuit according to an embodiment.

FIG. 6 is a diagram illustrating a noise comparison circuit according to an embodiment. Referring to FIG. 6, the noise comparison circuit 253 of FIG. 3 may include at least one logic circuit (or a logic gate). According to an embodiment, the noise comparison circuit 253 may include a first subtractor 611, a second subtractor 612, and a NOR gate 620.

For example, the first subtractor 611 may output a difference between the second reference voltage V2 and the sensed common mode voltage $V_{CM}$. When the sensed common mode voltage $V_{CM}$ is lower than the second reference voltage V2 due to the occurrence of noise, the first subtractor 611 may output a positive signal. When the sensed common mode voltage $V_{CM}$ is higher than the first reference voltage V1 due to the occurrence of noise, the second subtractor 612 may output a positive signal. In this case, when the output of any one of the first subtractor 611 and the second subtractor 612 is a positive signal, the NOR gate 620 may output "0" as the noise flag. As the noise flag of "0" is outputted, it may be determined that noise has occurred.

In contrast, when noise does not occur, the first subtractor 611 may output a negative signal because the sensed common mode voltage $V_{CM}$ is higher than the second reference voltage V2, and the second subtractor 612 may output a negative signal because the sensed common mode voltage $V_{CM}$ is lower than the first reference voltage V1. In this case, when both the first subtractor 611 and the second subtractor 612 output negative signals, the NOR gate 620 may output "1" as the noise flag. As the noise flag of "1" is outputted, it may be determined that noise has not occurred.

Figure 7:
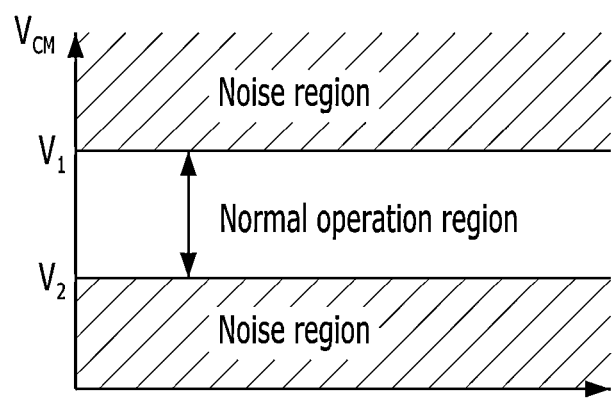
FIG. 7 is a graph illustrating a determination of whether noise occurs according to an embodiment.

FIG. 7 is a graph illustrating a determination of whether noise occurs according to an embodiment. Referring to FIG. 7, as described above, according to an embodiment, the noise comparison circuit 253 may compare a sensed common mode voltage $V_{CM}$ with the first reference voltage V1 outputted by the first DAC 251 or the second reference voltage V2 outputted by the second DAC 252, and may determine whether noise occurs, based on a result of the comparison.

For example, when the sensed common mode voltage $V_{CM}$ is higher than the first reference voltage V1 or lower than the second reference voltage V2, the noise comparison circuit 253 may determine that the sensed common mode voltage corresponds to a noise region. In contrast, when the sensed common mode voltage $V_{CM}$ is between the first reference voltage V1 and the second reference voltage V2, the noise comparison circuit 253 may determine that the sensed common mode voltage $V_{CM}$ corresponds to a normal operation region in which noise does not occur.

Figure 8:
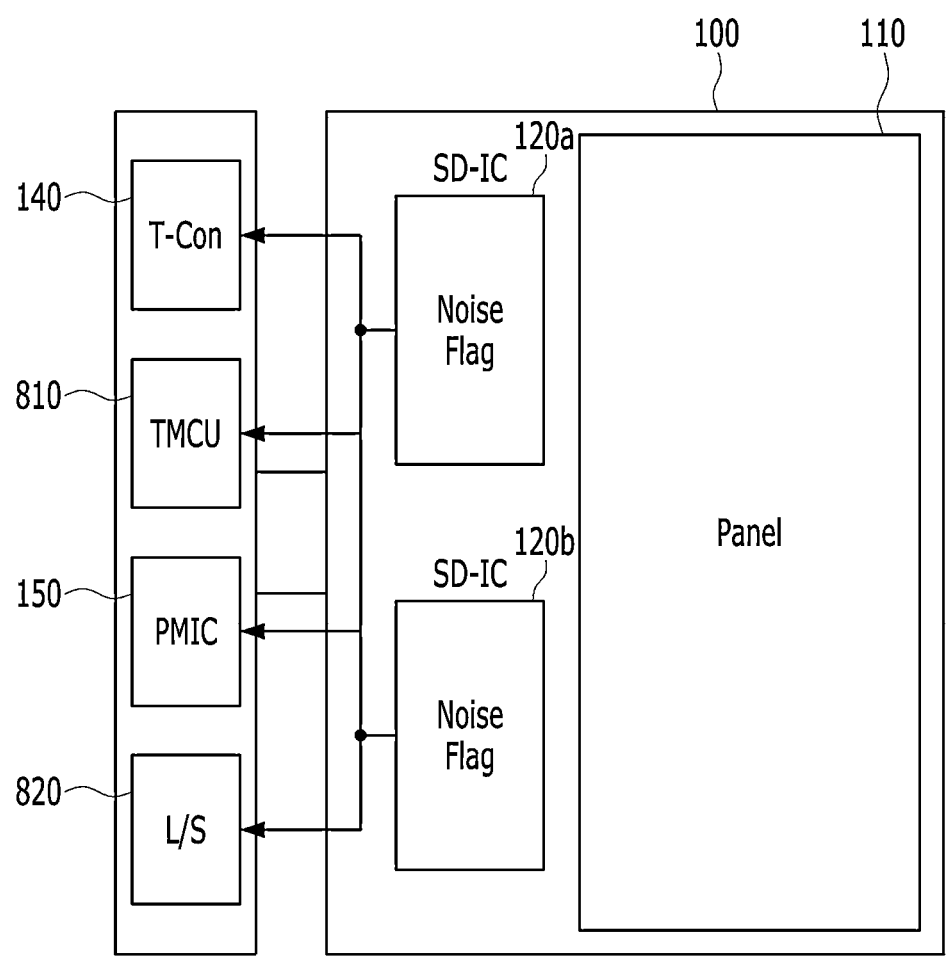
FIG. 8 is a diagram illustrating an apparatus for transmitting a noise flag according to an embodiment.

FIG. 8 is a diagram illustrating an apparatus for transmitting a noise flag according to an embodiment. Referring to FIG. 8, according to an embodiment, the display apparatus 100 may include the panel 110 and a plurality of data driving circuits 120a and 120b. A noise flag outputted by each of the data driving circuits 120a and 120b (e.g., the noise detection circuit 250) may indicate information on whether noise occurs. The noise flag may be transmitted to at least one of the controller 140 (e.g., a timing controller T-CON)), the PMIC 150, a touch controller 810 (e.g., a touch MCU (TMCU)), a source driver and touch readout IC (SRIC), a touch readout IC (ROIC)), and another high-density integrated circuit (e.g., a large scale (L/S) IC 820). For example, a first noise flag outputted by the first data driving circuit 120*a* may be transmitted to at least one of the controller 140, the PMIC 150, the touch controller 810, the SRIC, the touch ROIC, and the another high-density integrated circuit (e.g., a large scale (L/S) IC 820). A second noise flag outputted by the second data driving circuit 120*b* may be transmitted to at least one of the controller 140, the PMIC 150, the touch controller 810, the SRIC, the touch ROIC, and the another high-density integrated circuit (e.g., a large scale (L/S) IC 820).

According to an embodiment, the controller 140 (e.g., a timing controller T-CON) that has received a noise flag outputted by each of the data driving circuits 120*a* and 120*b* (e.g., the noise detection circuit 250) may control image data (e.g., second image data) to be retransmitted to the data driving circuits 120*a* and 120*b* through the LVDS transmission line. For example, the controller 140 that has received a noise flag outputted by each of the data driving circuits 120*a* and 120*b* (e.g., the noise detection circuit 250) may control a voltage of the LVDS transmission line to be increased and an increased voltage thereof to be transmitted according to the automatic VID function.

Figure 9:
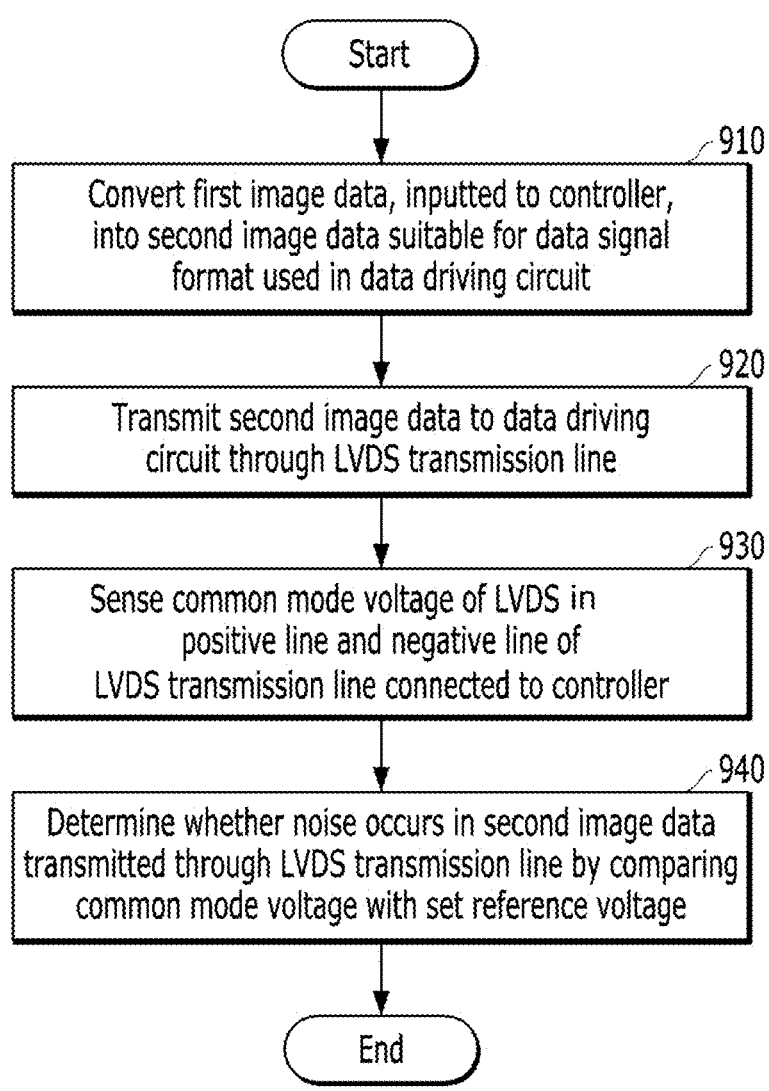
FIG. 9 is a flowchart illustrating a noise detection method for a display signal according to an embodiment.

FIG. 9 is a flowchart illustrating a noise detection method for a display signal according to an embodiment. Respective operations of FIG. 9 to be described hereinafter may be performed by respective elements of FIG. 1 to FIG. 8. Referring to FIG. 9, the controller 140 of the display apparatus 100 may convert first image data, inputted to the controller 140, into second image data suitable for a data signal format used in the data driving circuit 120 (step 910).

According to an embodiment, the controller 140 may transmit the second image data to the data driving circuit 120 through an LVDS transmission line (step 920).

According to an embodiment, the data driving circuit 120 may sense a common mode voltage $V_{CM}$ of an LVDS in the positive line and negative line of the LVDS transmission line connected to the controller 140 (step 930).

According to an embodiment, the data driving circuit 120 may determine whether noise occurs in the second image data transmitted through the LVDS transmission line by comparing the common mode voltage with a set reference voltage (e.g., the first reference voltage V1 or the second reference voltage V2) (step 940).

What is claimed is:

1. A data driving circuit comprising:
a reception circuit to receive image data transmitted from a controller through a low-voltage differential signal (LVDS) transmission line; and
a noise detection circuit to sense a common mode voltage of an LVDS in a positive line and a negative line of the LVDS transmission line and to determine whether noise occurs in the image data transmitted through the LVDS transmission line by comparing the common mode voltage with a reference voltage.

2. The data driving circuit of claim 1, further comprising a first resistor and a second resistor connected in series between the positive line and the negative line of the LVDS transmission line,
wherein the noise detection circuit is connected between the first resistor and the second resistor serially connected with each other and senses the common mode voltage of the LVDS.

3. The data driving circuit of claim 2, wherein the noise detection circuit determines that noise has occurred when the common mode voltage is higher than a first set reference voltage or lower than a second set reference voltage, wherein the second set reference voltage is set to be lower than the first set reference voltage.

4. The data driving circuit of claim 1, wherein the noise detection circuit generates a noise flag based on a result of the comparison between the common mode voltage and the reference voltage.

5. The data driving circuit of claim 4, wherein a duration of the noise flag is adjusted by a setting.

6. The data driving circuit of claim 1, wherein the noise detection circuit transmits information indicating that noise has occurred to at least one of a controller, a power management integrated circuit (PMIC), and a touch controller when it is determined that the noise has occurred.

7. A method for detecting noise of a display signal comprising:
receiving image data from a controller through a low-voltage differential signal (LVDS) transmission line;
sensing a common mode voltage of an LVDS in a positive line and a negative line of the LVDS transmission line; and
determining whether noise occurs in the image data transmitted through the LVDS transmission line by comparing the common mode voltage with a reference voltage.

8. The method of claim 7, wherein it is determined that noise has occurred when the common mode voltage is higher than a first set reference voltage or lower than a second set reference voltage, wherein the second set reference voltage is set to be lower than the first set reference voltage.

9. The method of claim 8, wherein the first set reference voltage or the second set reference voltage is adjusted by a set value in a data driving circuit.

10. The method of claim 7, further comprising generating a noise flag based on a result of the comparison between the common mode voltage and the reference voltage.

11. A display apparatus comprising:
a data driving circuit to supply through a data line a data voltage for driving each pixel in a panel in which a plurality of pixels are disposed; and
a controller to transmit image data to the data driving circuit through a low-voltage differential signal (LVDS) transmission line,
wherein the data driving circuit includes a noise detection circuit to sense a common mode voltage of an LVDS in a positive line and a negative line of the LVDS transmission line connected with the controller and to determine whether noise occurs in the image data transmitted through the LVDS transmission line by comparing the common mode voltage with a set reference voltage.

12. The display apparatus of claim 11, wherein:
the data driving circuit further comprises a first resistor and a second resistor connected in series between the positive line and the negative line of the LVDS transmission line connected with the controller, and
the noise detection circuit is connected between the first resistor and the second resistor serially connected with each other and senses the common mode voltage of the LVDS.

13. The display apparatus of claim 11, wherein the controller comprises a timing controller.

14. The display apparatus of claim 11, wherein the data driving circuit further comprises a lock signal generation circuit configured to generate a lock signal when noise is determined to have occurred in the image data received from the controller.

15. The display apparatus of claim 11, wherein the noise detection circuit determines that noise has occurred when the common mode voltage is higher than a first set reference voltage or lower than a second set reference voltage, wherein the second set reference voltage is set to be lower than the first set reference voltage.

16. The display apparatus of claim 15, wherein the first set reference voltage or the second set reference voltage is adjusted by a set value in the data driving circuit.

17. The display apparatus of claim 11, wherein the noise detection circuit generates a noise flag based on a result of the comparison between the common mode voltage and the reference voltage.

18. The display apparatus of claim 17, wherein a duration of the noise flag is adjusted by a setting.

19. The display apparatus of claim 11, wherein the data driving circuit controls an image displayed on the panel so as not to be updated when the result of the determination of the noise detection circuit indicates that noise has occurred.

20. The display apparatus of claim 11, wherein the data driving circuit transmits information indicating that noise has occurred to at least one of the controller, a power management integrated circuit (PMIC), a touch controller, a source driver and touch readout IC (SRIC), and a touch readout IC (ROIC) when the result of the determination of the noise detection circuit indicates that the noise has occurred.

* * * * *